United States Patent [19]
Cherkofsky

[11] 3,867,447
[45] Feb. 18, 1975

[54] HYDROXYGUANIDINE O-CARBAMATES

[75] Inventor: Saul Carl Cherkofsky, Wilmington, Del.

[73] Assignee: E. I. du Pont de Nemours and Company, Wilmington, Del.

[22] Filed: June 25, 1973

[21] Appl. No.: 373,147

Related U.S. Application Data

[63] Continuation-in-part of Ser. No. 283,775, Aug. 25, 1972, abandoned.

[52] U.S. Cl.... 260/564 G, 260/239 B, 260/239 BF, 260/293.73, 260/293.74, 260/326.82, 260/326.85, 260/340.5, 260/556 AR, 260/556 B, 260/556 S, 260/558 R, 260/558 D, 260/559 R, 260/564 E, 260/565, 260/566 R, 424/244, 424/267, 424/274, 424/321, 424/324, 424/326

[51] Int. Cl........................................... C07c 129/08

[58] Field of Search..... 260/564 A, 564 G, 556 AR, 260/556 B, 556 S, 559 R, 559 T, 559 A, 558 D, 557, 565

[56] References Cited
UNITED STATES PATENTS
| | | | |
|---|---|---|---|
| 3,217,037 | 11/1965 | Payne et al.............. | 260/566 AC |
| 3,742,056 | 6/1973 | Henderson................ | 260/564 G |

*Primary Examiner*—Leon Zitver
*Assistant Examiner*—Gerald A. Schwartz

[57] ABSTRACT

Disclosed herein are particular variously substituted 2-hydroxyguanidine O-carbamates, useful as antihypertensive agents, made by reacting an hydroxyguanidine with an isocyanate. Exemplary is 1-methyl-1-n-propylhydroxyguanidine O-(N-methyl carbamate).

12 Claims, No Drawings

HYDROXYGUANIDINE O-CARBAMATES

CROSS-REFERENCE TO RELATED APPLICATION

This application is a continuation-in-part of my copending application Ser. No. 283,775, filed Aug. 25, 1972 now abandoned.

BACKGROUND OF THE INVENTION

1. Field of the Invention

This invention concerns variously substituted 2-hydroxyguanidine O-carbamates.

2. Description of the Prior Art

J. V. Braun and R. Schwarz, Ber., 36, 3660 (1903) describe the preparation of the hydroxyguanidines:

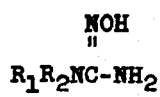

where $R_1 = \phi$; $R_2 = CH_3$; $R_1 = R_2 =$ n-propyl; and $R_1 = R_2 = \phi$.

C. Belzecki et al., J. Chem. Soc., Chem. Comm. 806, (1970). Reaction of hydroxylamine with 1,1-disubstituted cyanamides yields 1,1-disubstituted-2-hydroxyguanidines (I) or N,N-disubstituted-1-aminohydroxyformamidine (II);

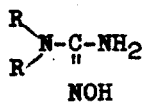 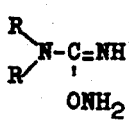

(I)  (II)

depending on the solvent and the cyanamide substituents. Various acyl derivatives but no carbamates are disclosed.

C. Belzecki et al., Tetrahedron Letters, No. 22, 1879 (1970). 1,3-Ethylene-2-hydroxyguanidine and 1,3-trimethylene-2-hydroxyguanidine are unstable but can be prepared in excess acetic acid or by use of the HCl salt of one reactant.

Acetylation yielded 0- and N-acetyl derivatives and acylation with ethyl chloroformate yielded the o-ethoxycarbonyl product. No carbamates are disclosed.

U.S. Pat. No. 3,505,336 discloses hydroxyguanidines of the type

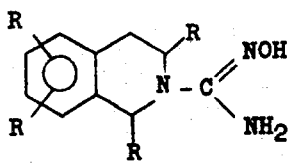

and their diacetyl derivatives as antihypertensive agents.

DESCRIPTION OF THE INVENTION

The invention is an antihypertensive compound of the general formula

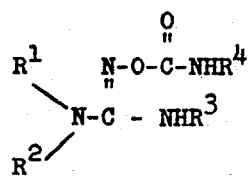

wherein $R^1$, $R^2$ and $R^3$ are selected from the group consisting of (A) hydrogen, (B) an aliphatic hydrocarbon group of 1–8 carbon atoms containing up to two substituents selected from the group consisting of F, Cl, Br and alkoxy of 1–4 carbon atoms and (C) a group of the formula

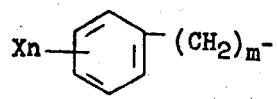

wherein

X is F, Cl, $C_1$–$C_3$ alkyl, $C_1$–$C_3$ alkoxy, $NO_2$, $CF_3$, $R^5R^6NCO$, $R^5R^6NSO_2$ or $R^7SO_2$;

$m = 0$–$2$;

$n = 0$–$3$;

$R^5$ and $R^6$ are H or $C_1$–$C_4$ alkyl;

$R^7$ is $CF_3$ or $C_1$–$C_4$ alkyl; with the proviso that $R^1$ and $R^2$ together can be -$(CH_2)_y$- where y is 4–9; and $R^4$ is hydrogen or $C_1$–$C_3$ alkyl; with the further provisos that 1. up to one of $R^1$, $R^2$ and $R^3$ is selected from (A), up to two of $R^1$, $R^2$ and $R^3$ is selected from (B), and up to one of $R^1$, $R^2$ and $R^3$ is selected from (C);
2. when $R^1$ is methyl and $R^2$ is hydrogen, $R^3$ is not unsubstituted phenyl or unsubstituted benzyl;
3. when $R^1$ is methyl and $R^3$ is hydrogen, $R^2$ is not unsubstituted phenyl; and
4. when one of $R^1$, $R^2$ and $R^3$ is hydrogen and the other two R groups are selected from (B), the total carbon atoms in the said other two groups is 3–9.

The compounds have a carbon double bond nitrogen arrangement which allows the existence of syn/anti isomers and these are intended to be included within the scope of the invention.

The invention also embraces an antihypertensive composition comprising one or more compounds having the general formula above and a physiologically inert pharmaceutical carrier.

Process

The process for preparing the compounds of the invention involves the reaction or a hydroxyguanidine with an isocyanate at a temperature in the range of −20° to 50°C. The reaction may be represented as:

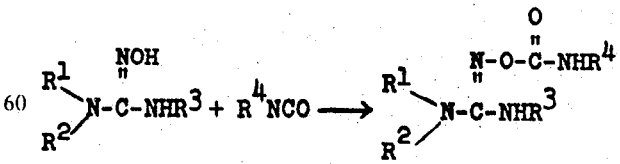

where $R^1$, $R^2$, $R^3$ and $R^4$ are as defined above.

When $R^4$ is hydrogen, an alternative process reacts the hydroxyguanidine is salt form,

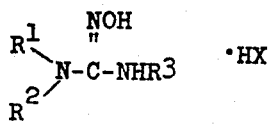

with an alkali metal cyanate, MOCN, wherein X is F, Cl or Br, and M is Na, K or Li.

The reactions for making hydroxyguanidine O-carbamates wherein $R^4$ is hydrogen are conducted in water solution. In such cases, cyanic acid is reacted with the hydroxyguanidine. Where the hydroxyguanidine salt is reacted with the alkali metal cyanate, the cyanic acid is formed in situ.

The hydroxyguanidine O-carbamates of the invention wherein $R^4$ is a $C_1$-$C_3$ aliphatic hydrocarbon group are prepared by adding the corresponding isocyanate to a solution of the hydroxyguanidine in a nonhydroxylic organic solvent preferably dioxane, tetrahydrofuran, ethyl acetate, chloroform, methylene chloride, diethyl ether, benzene, or the like, at a rate to maintain the temperature in the range of about −20° to +50°C.

DETAILS OF THE INVENTION

The 1,1-disubstituted 2-hydroxyguanidine precursors are made from the corresponding cyanamides and hydroxylamine according to the reaction:

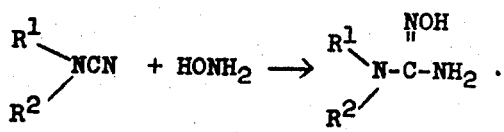

The procedure of J. V. Braun and R. Schwarz, Ber., 36, 3660 (1903) may be used or the general procedure illustrated hereafter where the cyanamide is methyl-n-butyl cyanamide.

An example of Braun's procedure comprises adding 1 mole equivalent of methylphenylcyanamide to a methanol solution of slightly more than 1 mole equivalent of free hydroxylamine. Reaction starts immediately at room temperature with heat evolution and yellowing. After some time the mixture is evaporated and an oil-crystalline mixture is separated into unreacted methylphenylcyanamide (ether-soluble, water-insoluble) and the sought 1-methyl-1-phenyl-hydroxyguanidine (soluble hot water and alcohol). Final purification is effected by crystallization from alcohol or hot water to give pure methylphenylhydroxyguanidine, melting at 102°C.

General Procedure

A 500-ml, 3-necked flask, fitted with a reflux condenser, magnetic stirrer and addition funnel was charged with 11.2 g (0.1 mole) of methyl-n-butylcyanamide, about 100 ml of ethanol and 13.9 (0.2 mole) of hydroxylamine hydrochloride. A solution of 10.6 g (0.1 mole) of sodium carbonate and 40 ml of water was added dropwise within a few minutes, the mixture refluxed for 2 hours and then cooled. The mixture was diluted with 200 ml of water and extracted four times with 100 ml of methylene chloride. The combined methylene chloride layers were dried and concentrated in a rotary evaporator. The residue from evaporation of the methylene chloride was purified by methanol elution from silica gel (silicAR CC-7, Mallinckrodt, special for chromatography) and identified as 1-methyl-1-n-butylhydroxyguanidine by its nmr spectrum; (CDCl$_3$) δ 0.9 (t, 3); 1.4 (m, 4); 2.7 (s, 3); 3.1 (t, 2); 6.1 (b, 3).

Employing the general procedure set out above, the 1,1-disubstituted hydroxyguanidines of Table 2 are made by reacting the corresponding cyanamides of Table 1 with hydroxylamine. The cyanamides of Table 1 are known or their synthesis will be obvious to those skilled in the art, especially in view of the references cited.

TABLE 1

Cyanamides - $R^1R^2NCN$

| Used in Example | $R^1$ | $R^2$ | B.P. °C/mm Hg | Reference |
|---|---|---|---|---|
| 1 | $CH_3$ | $n$-$C_4H_9$ | 87/12 | Ainley et al., J. Chem. Soc. 98 (1949) |
| 2 | $CH_3$ | $n$-$C_3H_7$ | 74/12 | |
| 3 | $CH_3$ | $C_2H_5$ | 59/14 | |
| 4 | $CH_3$ | $i$-$C_4H_9$ | 81/12 | |
| 5 | $CH_3$ | sec-$C_4H_9$ | 81/12 | |
| 6 | $CH_3$ | $n$-$C_5H_{11}$ | 52/0.45 | Beilstein, 4, I, 378 |
| 7 | $CH_3$ | $n$-$C_6H_{13}$ | 60/0.4 | |
| 8 | $C_2H_5$ | $C_2H_5$ | 69/12 | Beilstein, 4, 121 |
| 9 | $C_2H_5$ | $n$-$C_3H_7$ | 81/12 | |
| 10 | $n$-$C_3H_7$ | $n$-$C_3H_7$ | 51/0.5 | Beilstein, 4, 144 |
| 11 | $n$-$C_4H_9$ | $n$-$C_4H_9$ | 78/0.5 | Beilstein, 4, II, 635 |
| 12 | -(CH$_2$)$_6$- | | | |
| 13 | $CH_3$ | $C_6H_5$-$CH_2$ | 95/0.2 | Beilstein, 12, II, 565 |
| 14 | $CH_3$ | ⟨S⟩- | 65/0.1 | |

TABLE 1 - Continued

| Used in Example | R¹ | R² | bp °C/mmHg | Reference |
|---|---|---|---|---|
| 15 | methyl | isopropyl | 79°/23 mm | - |
| 16 | $CH_3$ | i-$C_4H_9$ | | - |
| 17 | methyl | cyclopentyl | 81/12 | - |
| 18 | allyl | allyl | 58°/0.05 | - |
| 19 | methyl | $(CH_3O)_2CHCH_2-$ | 77°/0.3 | - |
| 20 | $(CH_3CH_2OCH_2CH_2-)_2$ | | 100°/0.5 | - |
| 21 | methyl | p-chlorobenzyl | 115°/0.3 | V. Braun, Ber., 63B, 2407 (1930) |
| 22 | methyl | p-methoxybenzyl | 135°/0.4 | - |
| 23 | methyl | p-methylbenzyl | 100°/0.3 | - |
| 24 | methyl | p-nitrobenzyl | 180°/0.15 | V. Braun, Ber., 70B, 1241 (1937) |
| 25 | methyl | 3,4-dichlorobenzyl | 133°/0.3 | - |
| 26 | methyl | m-chlorobenzyl | 109°/0.2 | - |
| 27 | ethyl | benzyl | 100-102°/0.2 | W. L. Garbrecht and R. M. Herbst, J. Org. Chem., 18, 1003 (1953) |
| 28 | n-propyl | benzyl | 102-4°/0.15 | - |
| 29 | methyl | β-phenethyl | 102-5°/0.1 | V. Braun, Ber., 43, 3212 (1910) |
| 30 | methyl | p-fluorobenzyl | 95°/0.2 | V. Braun, Ber., 63, 2407 (1930) |
| 31 | ethyl | phenyl | 82-4°/0.3 | - |
| 32 | n-propyl | phenyl | 92-3°/0.2 | - |
| 33 | $CH_3$ | n-$C_4H_9$ | 87/12 | Ainley et al., J. Chem. Soc. 98 (1949) |
| 34 | $CH_3$ | $C_6H_5-CH_2$ | 95/0.2 | Beilstein, 12, II, 565 |

TABLE 2

1,1-Disubstituted Hydroxyguanidines — $R^1R^2NCNH_2$ with =NOH

| Used in Example | R¹ | R² | mp/°C | nmr (CDCl₃) |
|---|---|---|---|---|
| 1 | $CH_3$ | n-$C_4H_9$ | | δ 0.9 (t,3); 1.4 (m,4); 2.7 (s,3); 3.1 (t,2); 6.1 (b,3) |
| 2 | $CH_3$ | n-$C_3H_7$ | | δ 0.85 (t,3); 1.5 (s,2); 2.75 (s,3); 3.1 (t,2); 6.6 (b,3) |
| 3 | $CH_3$ | $C_2H_5$ | | δ 1.05 (t,3); 2.7 (s,3); 3.2 (q,2); 6.5 (b,3) |
| 4 | $CH_3$ | i-$C_4H_9$ | | δ 0.85 (d,6); 1.9 (m,1); 2.8 (s,3); 2.9 (d,2); 6.8 (b,3) |
| 5 | $CH_3$ | sec-$C_4H_9$ | | δ 0.85 (t,3); 1.0 (d,3); 1.4 (m,2); 2.6 (s,3); 3.7 (m,1); 6.6 (b,3) |
| 6 | $CH_3$ | n-$C_5H_{11}$ | | δ 0.9 (t,3); 1.3 (m,6); 2.8 (s,3); 3.2 (t,2); 7.1 (b,3) |
| 7 | $CH_3$ | n-$C_6H_{13}$ | | δ 0.9 (t,3); 1.3 (m,8); 3.0 (s,3); 3.35 (t,2); 8.0 (b,3) |
| 8 | $C_2H_5$ | $C_2H_5$ | | δ 1.0 (t,6); 3.2 (q,4); 6.4 (b,3) |
| 9 | $C_2H_5$ | n-$C_3H_7$ | | δ 0.85 (t,3); 1.05 (t,3); 1.5 (sex,2); 3.2 (q,2); 3.1 (t,2); 6.8 (b,3) |
| 10 | n-$C_3H_7$ | n-$C_3H_7$ | 98-103(1) | δ 0.9 (t,6); 1.55 (sex,4); 3.2 (t,4); 6.5-7.0 (b,3) |
| 11 | n-$C_4H_9$ | n-$C_4H_9$ (2) | | δ 0.9 (t,6); 1.4 (m,8); 3.1 (t,4); 6.4 (b,3) |
| 12 | -$(CH_2)_6$- | | | δ 1.55 (brs,8); 3.3 (brt,4); 7.0 (brs, 3) |
| 13 | $CH_3$ | $C_6H_5-CH_2$ | 89-90 | δ 2.65 (s,3); 4.2 (s,2); 6.5 (b,3); 7.2 (s,5) |
| 14 | $CH_3$ |  | | δ 1.2 (b,10); 2.7 (s,3); 3.5 (m,1); 6.8 (b,3) |

TABLE 2 - continued

| Used to make example | R¹ | R² | mp | nmr |
|---|---|---|---|---|
| 15 | methyl | isopropyl | oil | δ 1.1 (d, 6); 2.6 (s, 3); 3.95 (m, 1); 6.3 (broad, 3) |
| 16 | $CH_3$ | $i-C_4H_9$ | | δ 0.85 (d, 6); 1.9 (m, 1); 2.8 (s, 3); 2.9 (d, 2); 6.8 (b, 3) |
| 17 | methyl | cyclopentyl (HCl salt) | 105-110° | δ 1.6 (m, 8); 2.8 (s, 3); 3.3 (m, 1); 4.3 (broad, 1); 7.9 (broad, 2); 10.6 (s, 1) |
| 18 | allyl | allyl | oil | — |
| 19 | methyl | $(CH_3O)_2CHCH_2-$ | oil | δ 2.9 (s, 3); 3.3-3.5 (s + m, 8); 4.5 (t, 1); 5.6 (broad, 3) |
| 20 | $(CH_3CH_2OCH_2CH_2{-})_2$ | | oil | 1.2 (t, 6); 3.5 (m, 12); 6.8 (broad, 3) |
| 21 | methyl | p-chlorobenzyl | 99-100° | δ 2.7 (s, 3); 4.3 (s, 2); 4-6 (broad 3); 7.3 (~s, 4) |
| 22 | methyl | p-methoxybenzyl | 71-72° | δ 2.7 (s, 3); 3.8 (s, 3); 4.2 (s, 2); 4-6 (broad, 3); 7.0 ($A_2B_2q$, 4) |
| 23 | methyl | p-methylbenzyl | 103-103.5° | δ 2.3 (s, 3); 2.7 (s, 3); 4.25 (s, 2); 4-6 (broad, 3); 7.1 (s, 4) |
| 24 | methyl | p-nitrobenzyl | 159-160° | δ 2.7 (s, 3); 4.4 (s, 2); 5 (broad, 3); 7.8 ($A_2B_2q$, 4) |
| 25 | methyl | 3,4-dichlorobenzyl | 119-120° | δ 2.7 (s, 3); 4.25 (s, 2) 4-6 (broad, 3); 7.0-7.5 (m, 3) |
| 26 | methyl | m-chlorobenzyl | 102-3° | δ 2.75 (s, 3); 4.3 (s, 2); 4-6 (broad, 3); 7.2-7.4 (m, 4) |
| 27 | ethyl | benzyl | 83.5-84.5° | δ 1.1 (t, 3); 3.2 (q, 2); 4.3 (s, 2); ~6 (broad, 3); 7.2 (s, 5) |
| 28 | n-propyl | benzyl | 69-70° | δ 0.8 (t, 3); 1.5 (m, 2); 3.1 (t, 2); 4.3 (s, 2); 3-7 (broad, 3); 7.3 (s, 5) |
| 29 | methyl | β-phenethyl | 93-4° | δ 2.7 (s, 3); 2.75 (t, 2); 3.3 (t, 2); 4-7 (broad, 3); 7.2 (s, 5) |
| 30 | methyl | p-fluorobenzyl | 101-2° | δ 2.7 (s, 3); 4.25 (s, 2) 4-6 (broad, 3); 6.8-7.2 (m, 4) |
| 31 | ethyl | phenyl | 143-5° | δ 1.15 (t, 3); 3.6 (q, 2); 4-6 (broad, 3); 7.2 (m, 5) |
| 32 | n-propyl | phenyl | 104-5° | δ 0.9 (t, 3); 1.6 (m, 2); 3.5 (t, 2); 4.5 (broad, 3); 7.2 (m, 5) |
| 33 | $CH_3$ | $n-C_4H_9$ | | δ 0.9 (t, 3); 1.4 (m, 4); 2.7 (s, 3); 3.1 (t, 2); 6.1 (b,3) |
| 34 | $CH_3$ | $C_6H_5-CH_2$ | 89-90 | δ 2.65 (s, 3); 4.2 (s, 2); 6.5 (b, 3); 7.2 (s, 5) |

(1) Ber. 36, 3660 (1903).

(2) Belzecki et al. J. Chem. Soc., Chem. Comm. 806, (1970).

The 1,3-disubstituted 2-hydroxyguanidine precursors are prepared by the following reaction sequence and general procedure:

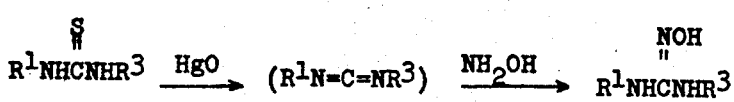

To a slurry of 0.1 mole of the 1,3-disubstituted thiourea in 150 ml ether is added 86.5 g (0.4 mole) of yellow mercuric oxide and 10 g of anhydrous sodium sulfate. The mixture is stirred vigorously for 2 hours, then is filtered. The filtrate is a solution of the crude 1,3-disubstituted carbodiimide. (Alternatively, some carbodiimides can be purchased commercially.)

To the solution of the carbodiimide in ether is added at 0° a solution of hydroxylamine in methanol prepared from 6.95 g (0.1 mole) of hydroxylamine hydrochloride and 5.6 g (0.1 mole) of potassium hydroxide in 60 ml methanol (filtered to remove potassium chloride). The reaction mixture of the carbodiimide and hydroxylamine is stirred at room temperature one-half hour, then rotary evaporated. The residue is dissolved in 100 ml water containing enough concentrated hydrochloric acid to make the solution acidic. Extraction with methylene chloride removes neutral impurities. The aqueous acidic solution is then treated with sodium hydroxide until basic, then extracted again with methylene chloride. The methylene chloride extracts are dried and rotary evaporated to give the crude 1,3-disubstituted hydroxyguanidine, which can generally be recrystallized from mixtures of methylene chloride and hexane.

The properties of representative 1,3-disubstituted hydroxyguanidines prepared by the above procedure are listed in Table 3.

The 1,1,3-trisubstituted hydroxyguanidine precursors are prepared by the reactions:

shown in German patent application No. 2,040,628 laid open for publication on Feb. 24, 1972, to M. Gross et al. as follows.

A solution of 4.1 g (0.05 mol) hydroxylamine hydrochloride in 30 ml dry methanol was cooled to 0° to −5°. A methanolic solution of 4.2 g (0.075 mol) of potassium hydroxide was added dropwise. The mixture was stirred for 30 minutes while adding a solution of 4.0 g (0.025 mol) of N-phenyl-N',N',S-trimethylisothiourea in 10 ml of dry methanol. The mixture was stirred for 3 hours and finally warmed to room temperature. The bulk of the solvent was distilled, the residue poured into water and the precipitated product collected on a filter. After drying, the product was crystallized from benzene/benzine (1/1); yield 0.8 g (18 percent of the theoretical); m.p. 134°–136.5°.

SPECIFIC EMBODIMENTS OF THE INVENTION

The following are illustrative examples in which all parts are by weight unless otherwise stated.

As an example, 1,1-dimethyl-3-phenyl-2-hydroxyguanidine ($R^1=R^2$=methyl, $R^3$=phenyl), melted at 134°–136°; nmr, δ 2.65 (s, 6); 7.1 (m, 5); 7.8 (broad, 2).

This compound was prepared by the procedure

EXAMPLE 1

1-Methyl-1-n-butylhydroxyguanidine O-(N-Methyl carbamate)

A 100-ml, 3-necked flask, fitted with a magnetic stirrer, reflux condenser and addition funnel was charged

TABLE 3

1,3-Disubstituted Hydroxyguanidines - $R^1$-NH-C(=NOH)-NHR^3$

| Used to Make Example | $R^1$ | $R^3$ | mp | nmr | Analysis (Average) |
|---|---|---|---|---|---|
| 35 | iso-propyl | iso-propyl | 124-8° | δ 1.15 (d, 12); 3.5 (m, 2); 3.8 (broad, 3) | Ref: G. Zinner and H. Gross, Ber., 105, 1709 (1972) |
| 36 | methyl | iso-butyl | 84-6° | δ 0.9 (d, 6); 1.8 (m, 1); 2.7 (s, 3); 2.8 (d, 2); 5-6 (broad, 3) | Calcd: C, 49.63; H, 10.41; N, 26.94 Found: C, 49.58; H, 10.11; N, 28.50. |

Reaction of these respective compounds with methyl isocyanate yielded:

35  1,3-diisopropyl hydroxyguanidine O-(N-methyl carbamate)

36  1-methyl-3-isobutyl hydroxyguanidine O-(N-methyl carbamate)

with 4.3 g (0.03 mole) of 1-methyl-1-n-butylhydroxyguanidine and 25 ml of benzene. A solution of 1.7 g (0.03 mole) of methyl isocyanate in 25 ml of benzene was added dropwise in 15 minutes and the reaction mixture stirred for 2 hours. The reaction mixture was evaporated on a rotary evaporator and the residue eluted with ether from silica gel. The 1methyl-1-n-butylhydroxyguanidine 0-(N-methyl carbamate) obtained was identified by proximate analysis and nmr spectrum.

| Anal. | C | H | N |
|---|---|---|---|
| Calcd for $C_8H_{18}N_4O_2$: | 47.51; | 8.97; | 27.70 |
| Found: | 48.01; | 8.85; | 27.12 |
|  | 48.18 | 8.94 | 27.36. | nmr (CDCl$_3$); δ 0.95, 1.4 (t, m, 7); 2.8 (s, 3); 2.85 (d, 3);
3.15 (t, 2); 4.8 (b, 2); 6.5 (b, 1).

EXAMPLE 2

1-Methyl-1-n-propylhydroxyguanidine 0-(N-Methyl carbamate)

This compound was prepared by a procedure analogous to that of Example 1, and was identified by proximate analysis and nmr spectrum.

| Anal. | C | H | N |
|---|---|---|---|
| Calcd for $C_7H_{16}N_4O_2$: | 44.67; | 8.57; | 29.76 |
| Found: | 43.46; | 8.53; | 29.18 |
|  | 43.32 | 8.23 | 28.89. | nmr (CDCl$_3$): δ 0.9 (t, 3); 1.5 (sex, 2); 2.8 (s, 3); 2.85
(d, 3); 3.1 (t, 2); 4.9 (b, 2); 6.6 (b, 1).

EXAMPLES 3–32

The following compounds were prepared by a procedure similar to that of Example 1, using the appropriate reactants.
Ex. Compound
(3) 1-methyl-1-ethylhydroxyguanidine 0-(N-methyl carbamate)
(4) 1-methyl-1-i-butylhydroxyguanidine 0-(N-methyl carbamate)
(5) 1-methyl-1-sec-butylhydroxyguanidine 0-(N-methyl carbamate)
(6) 1-methyl-1-n-pentylhydroxyguanidine 0-(N-methyl carbamate)
(7) 1-methyl-1-n-hexylhydroxyguanidine 0-(N-methyl carbamate)
(8) 1,1-diethylhydroxyguanidine 0-(N-methyl carbamate)
(9) 1-ethyl-1-n-propylhydroxyguanidine 0-(N-methyl carbamate)
(10) 1,1-di-n-propylhydroxyguanidine 0-(N-methyl carbamate)
(11) 1,1-di-n-butylhydroxyguanidine 0-(N-methyl carbamate)
(12) hexahydro-N'-(methylcarbamoyloxy)-1H-azepine-1-carboxamidine
(13) 1-methyl-1-benzylhydroxyguanidine 0-(N-methyl carbamate)
(14) 1-methyl-1-cyclohexylhydroxyguanidine 0-(N-methyl carbamate)
(15) 1-methyl-1-isopropylhydroxyguanidine 0-(N-methyl carbamate)
(16) 1-methyl-1-isobutylhydroxyguanidine 0-(N-ethyl carbamate)
(17) 1-methyl-1-cyclopentylhydroxyguanidine 0-(N-methyl carbamate)
(18) 1,1-diallylhydroxyguanidine 0-(N-methyl carbamate)
(19) 1-methyl-1-(2,2-dimethoxyethyl)hdyroxyguanidine 0-(N-methyl carbamate)
(20) 1,1-di(2-ethoxyethylhydroxyguanidine) 0-(N-methyl carbamate)
(21) 1-methyl-1-p-chlorobenzylhydroxyguanidine 0-(N-methyl carbamate)
(22) 1-methyl-1-p-methoxybenzylhydroxyguanidine 0-(N-methyl carbamate)
(23) 1-methyl-1-p-methylbenzylhydroxyguanidine 0-(N-methyl carbamate)
(24) 1-methyl-1-p-nitrobenzylhydroxyguanidine 0-(N-methyl carbamate)
(25) 1-methyl-1-(3,4-dichlorobenzylhydroxyguanidine) 0-(N-methyl carbamate)
(26) 1-methyl-1-(m-chlorobenzylhydroxyguanidine) 0-(N-methyl carbamate)
(27) 1-ethyl-1-benzylhydroxyguanidine 0-(N-methyl carbamate)
(28) 1-n-propyl-1-benzylhydroxyguanidine 0-(N-methyl carbamate)
(29) 1-methyl-1-(β-phenethyl)hydroxyguanidine 0-(N-methyl carbamate)
(30) 1-methyl-1-p-fluorobenzylhydroxyguanidine 0-(N-methyl carbamate)
(31) 1-ethyl-1-phenylhydroxyguanidine 0-(N-methyl carbamate)
(32) 1-n-propyl-1-phenylhydroxyguanidine 0-(N-methyl carbamate)

EXAMPLE 33

1-Methyl-1-n-butylhydroxyguanidine 0-Carbamate

A solution of 4.05 g (0.05 mole) of potassium cyanate in 15 ml of water was added to a mixture of 7.25 g (0.05 mole) of 1-methyl-1-n-butylhydroxyguanidine, 25 ml of water and 4.1 ml of concentrated hydrochloric acid. The mixture was stirred at room temperature for 4 days, then evaporated on a rotary evaporator. The residue was treated with 100 ml of acetonitrile and filtered to separate potassium chloride. The filtrate was evaporated and the residue chromatographed on 300 g of silica gel. Elution with chloroform gave 3.7 g of colorless oil (fractions 19–26, 250 ml each) that was identified as an 80:20 mixture of 1-methyl-1-n-butylhydroxyguanidine 0-carbamate and 1-methyl-1-n-butylurea characterized by infrared and nuclear magnetic resonance spectroscopy.

nmr: δ 0.9 (t, 3); 1.4 (m, 4); 2.8 (s, 3); 3.1 (t, 2); 4.7

(b, 2); 6.0 (b, 2). The impurity responsible for a singlet at δ 2.9 corresponds to about 20 percent of the above urea. Repetition of the chromatographic separation failed to remove the urea completely and an independent biological test showed that the urea was inactive as an antihypertensive agent.

1-Methyl-1-benzylhydroxyguanidine O-carbamate (34) was made by a procedure analogous to that of Example 33.

Other hydroxyguanidine O-carbamates that can be made by the procedures described herein include the following:

TABLE 4

| $R^1$ | $R^2$ | $R^4$ |
| --- | --- | --- |
| $CH_3-$ | $C_2H_5-$ | H |
| n-butyl- | n-butyl- | H |
| $CH_3-$ | $p-ClC_6H_4CH_2-$ | H |
| $CH_3-$ | $o-FC_6H_4CH_2-$ | H |
| $CH_3-$ | $p-CH_3C_6H_4CH_2-$ | H |
| $CH_3-$ | $o-CH_3OC_6H_4CH_2-$ | H |
| $CH_3-$ | $p-NO_2-C_6H_4CH_2-$ | H |
| $CH_3-$ | $2,4-(Cl_2)C_6H_3CH_2-$ | H |
| $CH_3-$ | $2,4-(CH_3O)_2C_6H_3CH_2-$ | H |
| $C_2H_5-$ | $2-Cl, 4-CH_3C_6H_3CH_2-$ | H |
| $CH_3-$ | $p-ClC_6H_4CH_2$ | $CH_3$ |
| $CH_3-$ | $o-FC_6H_4CH_2$ | $CH_3$ |
| $CH_3-$ | $p-CH_3C_6H_4CH_2$ | $CH_3$ |
| $CH_3-$ | $o-CH_3OC_6H_4CH_2$ | $CH_3$ |
| $CH_3-$ | $p-NO_2C_6H_4CH_2$ | $CH_3$ |
| $CH_3-$ | $2,4-(Cl_2)C_6H_3CH_2$ | $CH_3$ |
| $CH_3-$ | $2,4,6-(CH_3O)_3C_6H_2CH_2$ | $CH_3$ |
| $C_2H_5-$ | $2,4-(Cl)_2 6-CH_3-C_6H_2CH_2$ | $CH_3$ |
| $C_2H_5-$ | $3,5-(CH_3)_2C_6H_3CH_2$ | $CH_3$ |
| $CH_3$ | $C_2H_5$ | $C_2H_5$ |
| $CH_3$ | n-butyl | $C_2H_5$ |
| n-butyl | n-butyl | $C_2H_5$ |
| $CH_3$ | $m-ClC_6H_4CH_2$ | $C_2H_5$ |
| $CH_3$ | $p-FC_6H_4CH_2$ | $C_2H_5$ |
| $CH_3$ | $o-CH_3C_6H_4CH_2$ | $C_2H_5$ |
| $CH_3$ | $m-CH_3OC_6H_4CH_2$ | $C_2H_5$ |
| $C_2H_5$ | $p-NO_2C_6H_4CH_2$ | $C_2H_5$ |
| $C_2H_5$ | $2,4,6-(Cl)_3C_6H_2CH_2$ | $C_2H_5$ |
| $CH_3$ | $m-C_2H_5C_6H_4CH_2$ | $C_2H_5$ |
| $CH_3$ | $o-(C_2H_5O)C_6H_4CH_2$ | $C_2H_5$ |
| $CH_3$ | $ClCH_2CH_2CH_2-$ | H |

TABLE 4 - continued

| R¹ | R² | R⁴ |
|---|---|---|
| $C_2H_5$ | $CH_3OCH(CH_3)-CH_2-$ | H |
| $CH_2=CHCH_2-$ | $CH_2=CHCH_2-$ | H |
| n-Butyl | $BrCH_2CH_2CH_2-$ | $-CH_3$ |
| $CH_3$ | $(CH_3)_2C=CH-CH_2CH_2-$ | $-CH_3$ |
| $-C_2H_5$ | $CH_3CH_2OCH_2CH_2-$ | $-CH_3$ |
| $CH_3$ | $ClCH_2CH_2CH_2CH_2-$ | $-C_2H_5$ |
| n-Propyl | $CH_2=CHCH_2-$ | $-C_2H_5$ |
| n-Butyl | $CH_2=CHCH_2CH_2-$ | $-C_2H_5$ |

EXAMPLE 37

1,1-Dimethyl-3-phenyl-2-hydroxyguanidine 0-methyl carbamate

To a solution of 1.8 g of 1,1-dimethyl-3-phenyl-2-hydroxyguanidine in 20 ml of methylene chloride was added at 0°C. a solution of 0.62 g of methyl isocyanate in 5 ml methylene chloride. The mixed solution was stirred at room temperature for 1 hour and then evaporated. The residue was chromatographed on 60 g silica gel eluting with chloroform. The product was then recrystallized from methylene chloride/hexane to give 1.5 g of 1,1-dimethyl-3-phenyl-2-hydroxyguanidine 0-(N-methyl carbamate) mp. 90°-92°C. (dec.) (37).

Additional compounds which are prepared in a similar way are shown in Table 5.

TABLE 5

| R¹ | R² | R³ | R⁴ |
|---|---|---|---|
| $CH_3-$ | $C_2H_5-$ | $C_6H_5CH_2-$ | $n-C_3H_7$ |
| $-(CH_2)_5-$ | | $C_6H_5-$ | $CH_3$ |
| $CH_3-$ | $C_2H_5-$ | o— and p—$CH_3NHSO_2C_6H_4-$ | $C_2H_5$ |
| $CH_3-$ | 3,4-methylenedioxyphenyl | $C_2H_5-$ | H |
| $p-(CH_3)_2NSO_2C_6H_4-$ | $C_2H_5$ | $C_2H_5-$ | $i-C_3H_7$ |
| $CH_3-$ | $C_2H_5-$ | o— and p—$(CH_3)_2NCOC_6H_4$ | $C_2H_5$ |
| $C_2H_5$ | $CH_3$ | $m-NO_2C_6H_4-$ | $i-C_3H_7$ |
| $C_2H_5$ | $CH_3$ | $p-CF_3C_6H_4$ | $C_2H_5$ |
| $CH_3-$ | $C_2H_5$ | $C_6H_5CH_2$ | $C_2H_5$ |
| $C_2H_5$ | $CH_3$ | $2,4-(CH_3)_2C_6H_3$ | H |
| $CH_3-$ | $C_2H_5$ | $C_6H_5(CH_2)_2-$ | $CH_3$ |
| $C_2H_5$ | $C_2H_5$ | 3,4-methylenedioxy $C_6H_4(CH_2)_2-$ | $C_2H_5$ |
| $CH_3-$ | $3,4-Cl_2C_6H_3-$ | $C_2H_5-$ | $CH_3$, H |
| $n-C_4H_9$ | $m-ClC_6H_4-$ | $CH_3$ | $CH_3$, H, $C_2H_5$ |
| $CH_3-$ | $C_2H_5$ | o—, m—, and p—$FC_6H_4-$ | $CH_3$ |
| $CH_3-$ | $C_2H_5$ | $2,4-Cl_2C_6H_3-$ | $i-C_3H_7$ |
| $CH_3-$ | $C_2H_5$ | $2,4-F_2C_6H_3-$ | $CH_3$ |
| $CH_3-$ | $C_2H_5$ | $p-CF_3 C_6H_4CH_2-$ | $n-C_3H_7$ |
| $CH_3-$ | $C_2H_5$ | $p-NO_2C_6H_4-$ | $CH_3$ |

The compounds of this invention are antihypertensive agents. They can be employed in pharmaceutical compositions composed of the active ingredient, i.e., the compound(s) of the invention, in combination with physiologically inert pharmaceutical carriers and additives as is well known in the art. In the formulation of the antihypertensive composition, the active ingredient will ordinarily be present in an amount from about 0.5 to 95 percent based on total weight of the composition.

Formulations include injectables and oral dosage forms such as tablets, hard and soft gelatin capsules, suspensions, syrups, elixirs and the like. Additives that can be employed in such formulations include solvents and diluents, lubricants, binding agents, disintegrants, preservatives, colorants, flavors and other additives which are common and well known to the art.

The compounds of this invention can be administered in the treatment of hypertension by any means that effects contact of the active ingredient with the site of action in the body of a warm-blooded animal. For example, administration can be parenterally, i.e., subcutaneously, intravenously, intramuscularly or intraperitoneally. Alternatively or concurrently, administration can be by the oral route.

The dosage administered will be dependent upon the age, health and weight of the recipient. The extent of disease, kind of concurrent treatment, if any, frequency of treatment and the nature of the effect desired. Generally a daily dosage of active ingredient compound will be from about 0.01 to 50 milligrams per kilogram of body weight. Ordinarily from 0.05 to 40 and preferably 0.1 to 20 milligrams per kilogram per day in one or more applications per day is effective to obtain desired results. For more potent compounds of the invention the daily dosage ranges are from about 0.01 to 20 mg/kg, preferably 0.05 to 10 mg/kg, and more preferably 0.1 to 5 mg/kg.

The pharmaceutical carrier can be a sterile liquid such as water, or an oil, e.g., petroleum oil, animal oil, or vegetable oils such as peanut oil, soybean oil, mineral oil, sesame oil, and the like. In general, water, saline, aqueous dextrose (glucose) and related sugar solutions and glycols such as propylene glycol or polyethylene glycols are preferred liquid carriers, particularly for injectable solutions. Sterile injectable solutions will ordinarily contain from about 0.5 to 25 percent and preferably about 1 to 10 percent by weight of the active ingredient.

Liquid oral administration can be in a suspension, syrup or elixir, in which the active ingredient ordinarily will constitute from about 0.5 to 10 percent and preferably about 1 to 5 percent by weight. The pharmaceutical carrier in such composition can be an aqueous vehicle such as an aromatic water, a syrup, a pharmaceutical mucilage, or a hydro-alcoholic elixir. Additional information concerning pharmaceutical carriers, diluents and additives can be found in the well-known reference test: Martin, "Remington's Pharmaceutical Sciences."

The following examples further illustrate the preparation of pharmaceutical compositions of the invention.

Example A

A large number of unit capsules are prepared by filling standard two-piece hard gelatin capsules each with 50 mg of powdered active ingredient, 300 mg of lactose, 32 mg of talc and 8 mg of magnesium stearate.

Example B

A mixture of the active ingredient in soybean oil is prepared and injected by means of a positive displacement pump into gelatin to form soft gelatin capsules containing 35 mg of the active ingredient. The capsules are washed in petroleum ether and dried.

Example C

A large number of tablets are prepared by conventional procedures so that the dosage unit is 75 mg of active ingredient, 7 mg of ethyl cellulose, 0.2 mg of colloidal silicon dioxide, 3 mg of magnesium stearate, 11 mg of microcrystalline cellulose, 11 mg of cornstarch and 98.8 g of lactose. Appropriate coatings may be applied to increase palatability or delay absorption.

Example D

A parenteral composition suitable for administration by injection is prepared by stirring 1.5 percent by weight of the active ingredient in 10 percent by volume propylene glycol and water. The solution is sterilized by filtration.

Example E

An aqueous suspension is prepared for oral administration so that each 5 ml contain 50 mg of finely divided active ingredient, 500 mg of acacia, 5 mg of sodium benzoate, 1.0 g of sorbitol solution, U.S.P., 5 mg of sodium saccharin and 0.025 ml of vanilla tincture.

The physical and biological properties of representative hydroxyguanidine O-carbamates are collected in Table 6.

The Table shows the antihypertensive activity of the compounds of the invention as evidenced by tests conducted in hypertensive rats. In a test involving rats made hypertensive by repeated injections of desoxycorticosterone acetate (DOCA) according to the method described by Stanton and White [Arch. Intern. Pharmacodyn., 154, 351 (1965)], the compound of Example 1 is administered orally to each of eight or more test animals. The compound is prepared in an aqueous polyvinyl alcohol (PVA) acacia vehicle and administered at a volume to body weight ratio of 5.0 ml/kg. Systolic blood pressure is determined by the microphone-manometer technique [Friedman, M. and Freed, S. C., Pros. Soc. Exp. Biol. and Med., 70, 670 (1949)] at one or more time intervals after dosing.

It is determined as a result of the test that 2.6 mg per kg (mg/kg) of the compound of Example 1 produces a 30 mm mercury (mm Hg) reduction in blood pressure compared with the blood pressure of a concurrently tested group of 16 or more rats that are orally dosed with only the aqueous PVA-acacia vehicle. Other compounds of the invention tested in a similar manner also show a significant activity in reducing blood pressure as is shown in Table 6.

It has also been determined that the compound of Example 4 significantly lowered the systolic and diastolic arterial blood pressure of anesthetized normotensive dogs when injected intravenously at cumulative doses of 2.7 mg/kg and above.

TABLE 6
Hydroxyguanidine O-Carbamates and their Physical and Antihypertensive Properties

| Example | $R^1$ | $R^2$ | $R^4$ | Reduction in Blood Pressure at Dosage of 50 mg/kg | $ED_{50}$ (1) | mp °C | nmr (CDCl$_3$) | Analyses (Average of Determination) |
|---|---|---|---|---|---|---|---|---|
| 1 | CH$_3$ | n-C$_4$H$_9$ | CH$_3$ | 72 | 2.6 | — | δ 0.95, 1.4 (t,m,7); 2.8 (s,3); 2.85 (d,3); 3.15 (t,2); 4.8 (b,2); 6.5 (b,1) | Calcd: C, 47.51; H, 8.97; N, 27.70<br>Found: C, 48.09; H, 8.90; N, 27.24 |
| 2 | CH$_3$ | n-C$_3$H$_7$ | CH$_3$ | 68 | 4.5 | — | δ 0.9 (t,3); 1.5 (sex,2); 2.8 (s,3); 2.85 (d,3); 3.1 (b,2); 4.9 (b,2); 6.6 (b,1) | Calcd: C, 44.67; H, 8.57; N, 29.76<br>Found: C, 43.39; H, 8.38; N, 29.03 |
| 3 | CH$_3$ | C$_2$H$_5$ | CH$_3$ | 71 | 3.6 | 61-64 | δ 1.10 (t,3); 2.8 (s,3); 2.85 (d,3); 3.2 (q,2); 4.8 (b,2); 6.5 (b,1) | Calcd: C, 41.37; H, 8.10; N, 32.16 (2)<br>Found: C, 41.31; H, 8.33; N, 32.07 |
| 4 | CH$_3$ | i-C$_4$H$_9$ | CH$_3$ | 71 | 2.0 | 90-91 | δ 0.9 (d,6); 1.9 (m,1); 2.8 (s,3); 2.84 (d,3); 2.91 (d,2); 4.65 (b,2); 6.5 (b,1) | Calcd: C, 47.51; H, 8.97; N, 27.70 (2)<br>Found: C, 47.53; H, 8.97; N, 27.97 |
| 5 | CH$_3$ | sec-C$_4$H$_9$ | CH$_3$ | 60 | 4.5 | — | δ 0.85 (t,3); 1.1 (d,3); 1.5 (m,2); 2.6 (s,3); 2.85 (d,3); 3.75 (m,1); 4.8 (b,2); 6.6 (b,1) | |
| 6 | CH$_3$ | n-C$_5$H$_{11}$ | CH$_3$ | 50 | 5.4 | 74-75 | δ 0.9 (t,3); 1.4 (m,6); 2.8 (s,3); 2.85 (d,3); 3.1 (t,2); 4.8 (b,2); 6.6 (b,1) | Calcd: C, 49.98; H, 9.32; N, 25.90 (2)<br>Found: C, 49.96; H, 9.67; N, 25.82 |
| 7 | CH$_3$ | n-C$_6$H$_{13}$ | CH$_3$ | 63 | 3.8 | 55-61 | δ 0.9 (t,3); 1.3 (m,8); 2.8 (s,3); 2.85 (d,3); 3.1 (t,2); 4.6 (b,2); 6.5 (b,1) | Calcd: C, 52.15; H, 9.65; N, 24.33 (2)<br>Found: C, 53.63; H, 10.11; N, 23.44 |
| 8 | C$_2$H$_5$ | C$_2$H$_5$ | CH$_3$ | 68 | 2.2 | — | δ 1.1 (t,6); 2.8 (d,3); 3.2 (q,4); 4.8 (b,2); 6.5 (b,1) | |
| 9 | C$_2$H$_5$ | n-C$_3$H$_7$ | CH$_3$ | 46 | 27.0 | — | δ 0.9 (t,3); 1.15 (t,3); 1.6 (m,2); 2.85 (d,3); 3.1 (t,2); 3.2 (q,2); 4.7 (b,2); 6.5 (b,1) | |

(1) Oral dose in mg/kg to reduce blood pressure 30 mm Hg.  (2) Single determinations.

TABLE 6 - continued

| Example | R¹ | R² | R⁴ | Reduction in blood pressure at 50 mg/kg (mm Hg) | ED₃₀ | mp | nmr | Anal. (Average) |
|---|---|---|---|---|---|---|---|---|
| 30 | methyl | p-fluorobenzyl | methyl | 64 | - | 101-2° | δ 2.8 (s + d, 6); 4.3 (s, 2) 4.9 (broad, 2) 6.4 (broad, 1) 6.8-7.4 (m, 4) | Calcd C, 51.96;H, 5.95; N, 22.03 Found C, 52.19; H, 6.02; N, 22.21 |
| 31 | ethyl | phenyl | methyl | 80 | - | 76.5-77.5° | δ 1.1 (t, 3) 2.9 (d, 3) 3.7 (q, 2) 4.6 (broad, 2) 6.6 (broad, 1) 7.4 (m, 5) | Calcd C,55.93; H, 6.82; N, 23.71 Found C, 55.82; H, 6.63; N, 23.46 |
| 32 | n-propyl | phenyl | methyl | 89 | - | 79-80° | δ 0.9 (t, 3) 1.6 (m, 2) 2.9 (d, 3) 3.8 (t, 2) 4.6 (broad, 2) 6.5 (broad, 1) 7.3 (m, 5) | Calcd C, 57.59; H, 7.23; N, 22.38; Found C, 58.02; H, 7.25; N, 22.50 |

| Example | R¹ | R² | R⁴ | Reduction in blood pressure at 50 mg/kg | ED₃₀ | mp | nmr | Analysis (Average) |
|---|---|---|---|---|---|---|---|---|
| 33 | CH₃ | n-C₄H₉ | H | 72 | 10.0 | oil | δ 0.9 (b, 3); 1.4 (m, 4); 2.8 (s, 3); 3.1 (t, 2); 4.7 (b, 2); 6.0 (b, 2) | |
| 34 | methyl | benzyl | H | 56 | 12.5 | 127-8° | δ 2.8 (s, 3); 4.35 (s, 2); 4.7 (broad, 2); 5.8 (broad, 2); 7.3 (s, 5) | Calcd C, 54.04; H, 6.35; N, 25.21 Found C, 53.48; H, 6.13; N, 24.66 |

| Example | R¹ | R³ | R⁴ | | | | | |
|---|---|---|---|---|---|---|---|---|
| 35 | isopropyl | isopropyl | methyl | 81 | 15 | 114-115° | δ 1.2 (d, 12); 2.9 (d, 3); 3.5 (m, 2); 4.7 (broad, 2); 6.6 (broad, 1) | Calcd C, 49.98; H, 9.32; N, 25.90 Found C, 50.32; H, 9.41; N, 26.18 |
| 36 | methyl | isobutyl | methyl | 36 | - | 131-2° | syn/anti mixture | Calcd C, 47.51; H, 8.97; N, 27.70 Found C, 47.40; H, 8.94; N, 27.55 |

1,1,3-Trisubstituted

| Example | R¹ | R² | R³ | R⁴ | Reduction in blood pressure at 50 mg/kg | ED₃₀ | mp | nmr | Analysis (Average) |
|---|---|---|---|---|---|---|---|---|---|
| 37 | methyl | methyl | phenyl | methyl | 61 | 14 | 90-2°(dec) | δ 2.7 (s, 6); 2.9 (d, 3); 6.3-7.4 (m, 7) | Calcd C, 55.92; H, 6.83; N, 23.71 Found C, 55.64; H, 6.71; N, 23.42 |

The embodiments of the invention in which an exclusive property or privilege is claimed are defined as follows:

1. A compound of the formula $$R^1 \underset{R^2}{\overset{}{\diagdown}} N-C(=O)-NHR^3, \quad N-O-C(=O)-NHR^4$$

wherein R¹, R² and R³ are selected from the group consisting of
A. hydrogen,
B. an aliphatic hydrocarbon group of 1-8 carbon atoms containing up to two substituents selected from the group consisting of F, Cl, Br and alkoxy of 1-4 carbon atoms and
C. a group of the formula

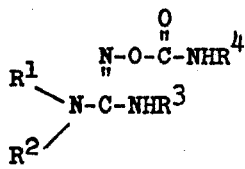

$$X_n{-}\underset{}{\bigcirc}{-}(CH_2)_m{-}$$

wherein X is F, Cl, $C_1$-$C_3$ alkyl, $C_1$-$C_3$ alkoxy, $NO_2$, $CF_3$, $R^5R^6NCO$, $R^5R^6NSO_2$ or $R^7SO_2$;
m = 0-2
n = 0-3
$R^5$ and $R^6$ are H or $C_1$-$C_4$ alkyl;
$R^7$ is $CF_3$ or $C_1$-$C_4$ alkyl;
$R^4$ is hydrogen or $C_1$-$C_3$ alkyl; and with the proviss that
1. up to one of R¹, R² and R³ is selected from (A) up to two of R¹, R² and R³ is selected from (B), and up to one of R¹, R² and R³ is selected from (C);
2. when R¹ is methyl and R² is hydrogen, R³ is not unsubstituted phenyl or unsubstituted benzyl;
3. when R¹ is methyl and R³ is hydrogen, R² is not unsubstituted phenyl; and
4. when one of R¹, R² and R³ is hydrogen and the other two R groups are selected from (B), the total carbon atoms in the said other two groups is 3-9.

2. A compound according to claim 1 wherein one of R¹ and R² is selected from (B), the other is selected from (C), and R³ is hydrogen.

3. A compound according to claim 1 wherein R¹ and R² are each selected from (B) and R³ is hydrogen.

4. A compound according to claim 1 wherein R¹ or R² is selected from (B), the other of R¹ or R² is hydrogen and R³ is selected from (B).

5. A compound according to claim 1 which is 1-methyl-1-p-fluorobenzylhydroxyguanidine 0-(N-methyl carbamate).

6. A compound according to claim 1 which is 1-methyl-1-p-chlorobenzylhydroxyguanidine 0-(N-methyl carbamate).

7. A compound according to claim 1 which is 1-methyl-1-p-nitrobenzylhydroxyguanidine 0-(N-methyl carbamate).

8. A compound according to claim 1 which is 1-methyl-1-i-butylhydroxyguanidine 0-(N-methyl carbamate).

9. A compound according to claim 1 which is 1-ethyl-1-phenylhydroxyguanidine 0-(N-methyl carbamate).

10. A compound according to claim 1 which is 1-n-propyl-1-phenylhydroxyguanidine 0-(N-methyl carbamate).

11. A compound according to claim 1 which is 1,1-di-n-propylhydroxyguanidine 0-(N-methyl carbamate).

12. A compound according to claim 1 which is 1-methyl-1-benzylhydroxyguanidine 0-(N-methyl carbamate).

* * * * *